United States Patent [19]

Armstrong

[11] Patent Number: 5,038,490

[45] Date of Patent: Aug. 13, 1991

[54] CERAMIC TILE GAUGE

[75] Inventor: Derrick Armstrong, Ponteland, England

[73] Assignee: Creative Products & Development Limited, United Kingdom

[21] Appl. No.: 517,167

[22] Filed: May 1, 1990

[30] Foreign Application Priority Data

May 9, 1989 [GB] United Kingdom ................ 8910591

[51] Int. Cl.[5] ........................................ G01B 3/30

[52] U.S. Cl. ............................ 33/527; 33/DIG. 20; 33/562

[58] Field of Search ................ 33/526, 527, DIG. 20, 33/562

[56] References Cited

U.S. PATENT DOCUMENTS 3,718,980 3/1973 Poulos .................... 33/DIG. 20 X
4,827,625 5/1989 LeHoal ............................ 33/527

FOREIGN PATENT DOCUMENTS 1291438 10/1972 United Kingdom ................ 33/527
2185115 7/1987 United Kingdom ................ 33/527

*Primary Examiner*—Harry N. Haroian
*Attorney, Agent, or Firm*—Abelman Frayne Rezac & Schwab

[57] ABSTRACT

A ceramic tile gauge for determining the shape of a space between a fixed tile and an adjacent fixed member and for enabling a tile to be cut to the shape of the space comprises a body member having an abutment surface thereon and a pair of arm members extending rearwardly of the body member. A pair of engagement means are slidably mounted one on each arm member to be selectively and releasably lockable to the arm members whereby, with the abutment surface engaging the fixed member and with the engagement means located and locked in operative positions on the arm members and in engagement with the bounding edge of the fixed tile, the abutment surface and a straight line through the engagement means define opposed edges of the space.

5 Claims, 2 Drawing Sheets

CERAMIC TILE GAUGE

BACKGROUND OF THE INVENTION

This invention relates to a ceramic tile gauge and more particularly to such a gauge for accurately measuring the size and shape of the part-tile at the end of a row of tiles.

When tiling an area of floor or wall with ceramic tiles it is usual to terminate each horizontal or vertical row of tiles, be it adjacent a wall, ceiling, skirting board or the like, with a part-tile. Although the rows of tiles in question may be accurately aligned with the horizontal or vertical, it is quite common for the wall, ceiling, skirting board or the like to be slightly offset from the horizontal or vertical whereby a space of tapering width remains at the end of the row. In order to ensure an attractive finish to the tiled area, it is necessary for the shape of the end part-tile to conform with the shape of said end space, be it tapering or otherwise.

It is known to provide calliper-like devices for measuring the width of a space at the end of a row of tiles, but these devices are only able to determine the width of the space at any given point therealong and cannot immediately detect a tapering space and the angle the cut edge of the tile should have. In this respect, these devices only provide a guide for a straight cut at either the maximum or minimum width of the space and require the use of a specialised tile cutter which must be used in a handed manner.

It is also known, for example from United Kingdom specification No. 2185115B, to provide a tile gauge or jig capable of detecting and determining a tapering shape at the end of a row of tiles and whereby a correspondingly-shaped tile can be cut using the gauge.

However, the jig in question is of relatively complex and therefore expensive construction, comprising a plurality of components incorporating both pivotal and slidable connections therebetween.

Pivotal joints in particular are extremely prone to jamming or otherwise failing, especially in tiling environments where adhesive can get everywhere.

SUMMARY OF THE INVENTION

It is an object of the invention to provide a gauge capable of determining the shape of a space to be tiled and enabling a tile to be cut to that shape using a conventional tile cutter, and which is simpler in construction than the known arrangements and in particular which eliminates any pivotal connections therein.

According to the present invention there is provided a ceramic tile gauge for determining the shape of a space between a fixed tile and an adjacent fixed member, the gauge comprising a body member including an abutment surface extending transversely of the gauge, a pair of transversely-spaced arm members extending rearwardly of the body member, and a pair of engagement means one on each arm member, the engagement means each being slidably mounted on the associated arm member to be selectively and releasably lockable on said arm member, the arrangement being such that, with the abutment surface on the body member engaging with the fixed member, the engagement means are moved along the arm members into operative positions in which abutment regions thereof engage the bounding edge of the fixed tile and are locked in said positions, the abutment surface on the body member and a straight line through the abutment regions of the engagement means then defining opposed edges of said space.

Thus it will be appreciated that the gauge so adjusted can be transferred and fitted to a tile to be cut, with the engagement means abutting an edge of the tile and with the abutment surface on the body member lying across the tile surface for the guidance therealong of a conventional, non-handed tile cutting tool.

Conveniently the engagement means each comprise a slide member movable along the length of the associated arm member and including a downwardly-projecting pin member having a rear abutment region which, in the operative position of the slide member, engages the bounding edge of the fixed tile, and a front abutment region which, when the gauge is fitted to a tile to be cut, abuts the edge of said tile, the spacing between the front and rear abutment regions of the pin member being equal to twice the grouting space between adjacent tiles, typically one eighth of an inch.

Preferably each slide member includes a cam portion selectively movable into and out of locking engagement with the associated arm member, while it is further preferred that the arm members are each of generally trapezoidal or wedge-shape in transverse section, each slide member having a correspondingly-shaped recess formed therethrough.

The slide members are preferably removably and interchangeably mounted on the associated arm members.

Conveniently the body member includes an upwardly and rearwardly extending plate portion thereon adapted to provide a finger grip to the gauge.

The gauge may further comprise an elongate adaptor member having an abutment surface thereon of length greater than that of the body member and releasably attachable to the body member to enable use of the gauge with increased-width tiles.

DESCRIPTION OF THE PREFERRED EMBODIMENT

Figure 1:
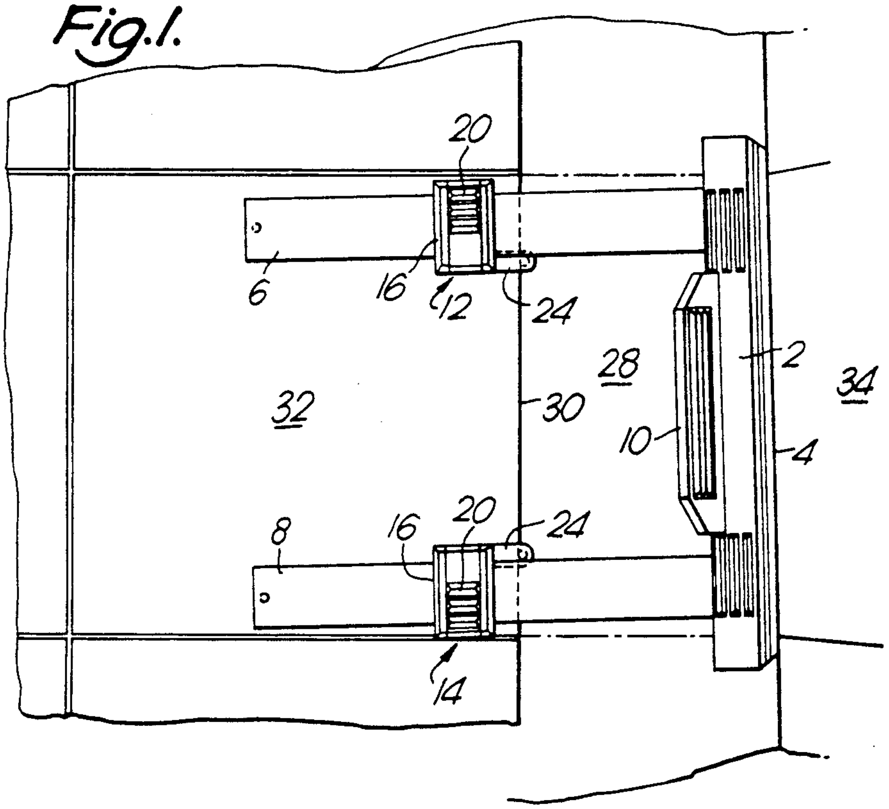
FIG. 1 is a plan view of a ceramic tile gauge in a position determining the shape of a space to be tiled.

Referring to the drawings, the illustrated gauge is moulded from a plastics material and includes a generally rectangular body member 2 having a straight abutment edge 4 along the front thereof and from the rear of which project a pair of transversely-spaced, parallel arm members 6,8 each extending perpendicularly to the abutment edge 4.

Figure 5:
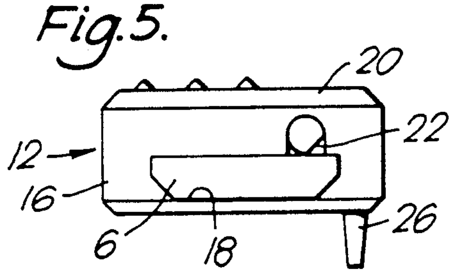
FIG. 5 is a side view in the direction of arrow 'A' in FIG. 7 of a slide member of the gauge of FIGS. 1 to 3 in the locked position thereof on an arm member of the gauge.

The arm members 6,8 are each of generally trapezoidal or wedge shape in transverse section as best seen in FIG. 5, while an upwardly and rearwardly projecting plate portion 10 extends from the rear edge of the body member 2 to form a finger grip for the gauge.

The body member 2, arm members 6,8 and plate portion 10 are conveniently integrally moulded, and, when the gauge is to be used on 6 inch tiles, the body member 2 is preferably about 7 inches long, while the distance from the abutment edge 4 of the body member 2 to the free end of each arm member 6,8 is preferably also about 7 inches.

The gauge further includes a pair of slide members indicated generally at 12,14 one mounted on each of the arm members 6,8.

More particularly each slide member 12,14 comprises a body portion 16 having an apertures 18 therethrough the shape of which conforms with that of a transverse section through the arm members 6,8 and adapted to receive therethrough the associated arm member 6 or 8 whereby the slide members 12,14 are slidable along the lengths of said arm members 6,8.

Each slide member 12,14 includes a pivotal lever 20 mounted thereon and provided with a cam portion 22 so arranged that, with the slide member 12 or 14 located on the associated arm member 6 or 8 and with the lever 20 pivoted to its closed position as shown in FIG. 5, the cam portion 22 frictionally engages the upper surface of the arm member 6 or 8 to lock the slide member 12 or 14 relative to the arm member 6 or 8.

Figure 6:
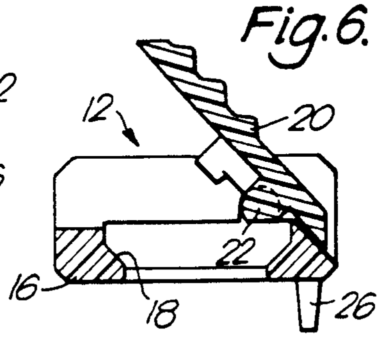
FIG. 6 is a section through the slide member of FIG. 5 in its unlocked position.
Figure 7:
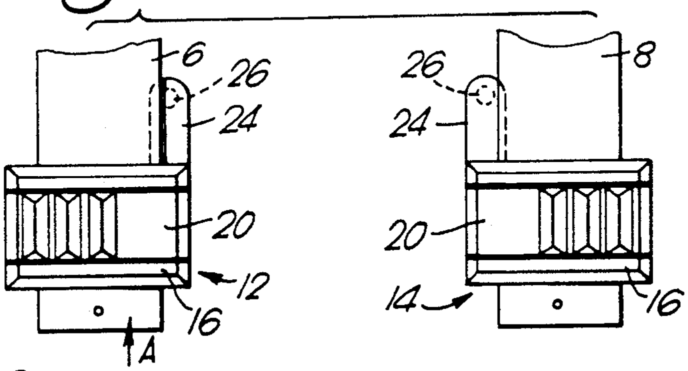
FIG. 7 is a plan view from above of the slide members and parts of the arm members of the gauge of FIGS. 1 to 3.

On pivoting the lever 20 to the release position shown in FIG. 6, the slide member 12 or 14 can be moved freely along the associated arm member 6 or 8.

Integrally formed with the body portion 16 of each slide member 12,14 is a forwardly-extending arm portion 24 downwardly from the free end of which projects a tapering pin member 26 of circular transverse section. Each pin member 26 is located substantially adjacent the inner edge of the associated arm member 6 or 8, which inner edges are transversely spaced by a distance of typically 4 inches. Each pin member 26 can be spaced up to about 6 inches from the abutment surface 4 of the body member 2 by appropriate sliding movement of the slide members 12,14 along the arm members 6,8.

The described gauge can be used to determine the shape of a space 28 between the front edge 30 of a fixed tile 32 and the edge of a bounding fixture 34 such as a wall, skirting board, ceiling or the like as seen in FIG. 1.

More particularly, and with the user holding the plate portion 10, the abutment surface 4 of the body member 2 is located against the edge of the wall 34 with the arm members 6,8 extending rearwardly therefrom over the tile 32. The levers 20 of the slide members 12,14 are pivoted into their released positions and the slide members 12,14 are moved along the arm members 6,8 away from the body member 2 until the pin members 26 engage the edge 30 of the fixed tile 32.

The levers 20 are then pivoted into their locked positions to secure the slide members 12,14, and therefore the pin members 26, relative to the body member 2. It will thus be appreciated that the abutment surface 4 of the body member 2 and a straight line connecting the rear abutment regions of the pin members 26 define between them the shape of the space 28 which may be of a tapering nature.

The maximum diameter of the pin members is about one eighth of an inch which is equal to twice the width of the preferred grouting gap between adjacent tiles, and consequently the abutment surface 4 of the body member 2 and a straight line connecting the front regions of the pin members 26 define between them the shape of a part-tile that will fill the space 28 with a grouting gap to each side thereof.

Figure 2:
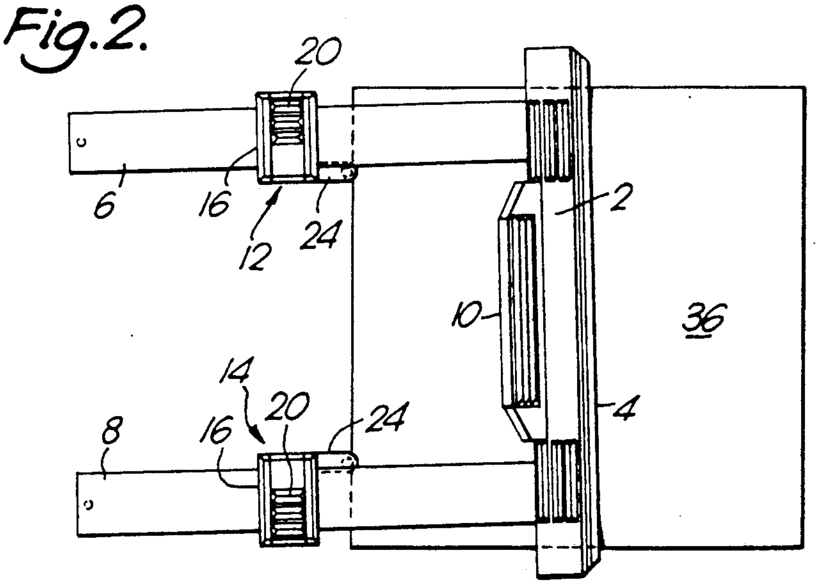
FIG. 2 is a plan view of the gauge of FIG. 1 fitted to a tile to be cut.
Figure 3:
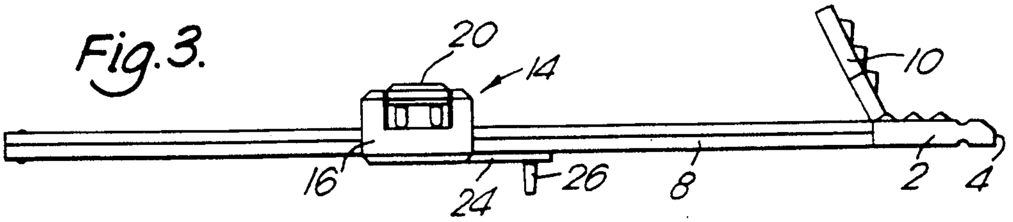
FIG. 3 is a side view of the gauge of FIGS. 1 and 2.

In order to cut such a part-tile, the gauge so adjusted is positioned on a tile 36 (FIG. 2) with the front regions of the pin members 26 abutting an edge of the tile 36 and with the body member 2 overlying an intermediate region of the tile.

A conventional tile-cutting tool is then drawn along the abutment surface 4 of the body member 2 to score the tile at the appropriate place, and a part-tile of the desired shape is effected by breaking the tile 36 along the score so formed. Alternatively, a guide line may be drawn along the abutment surface 4 and the tile 36 may be subsequently scored and broken as described.

The gauge as described above and illustrated is suitable for use with 6 inch ceramic tiles. However, the gauge can readily be adapted for use with 8 inch tiles. More particularly, the body member 2 is provided with grooves 38 in the upper and lower surfaces thereof extending the full length of the body member and whereby an elongate adaptor piece having a 9 inch long abutment surface thereon can be releasably slid over the front regions of the body member 2 with upper and lower flanges on said adaptor piece slidably received in the grooves 38.

Figure 4:
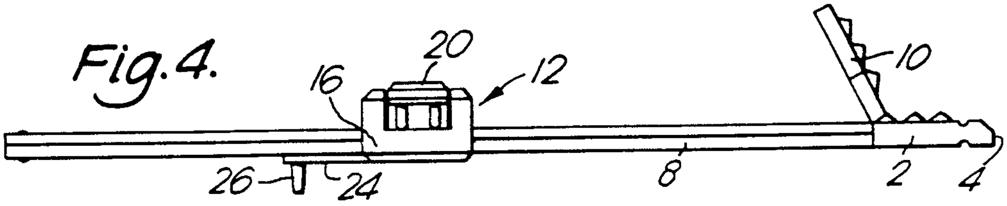
FIG. 4 is a side view of the gauge of FIGS. 1 and 2 with the slide members thereon having been interchangeably reversed.
Figure 8:
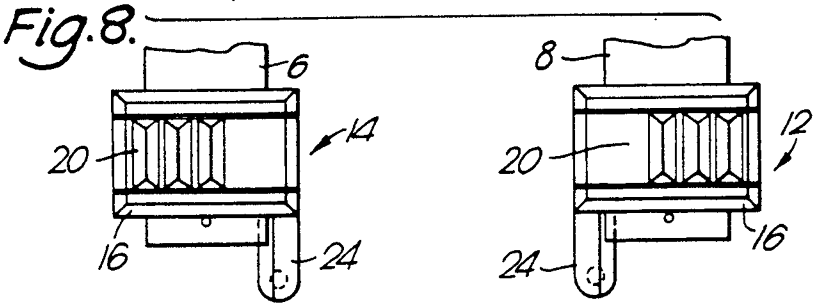
FIG. 8 is a plan view from above of the slide members and parts of the arm members of FIG. 7 but with the slide members having been interchanged and reversed.

At the same time, the slide members 12,14 can be removed from the arm members 6,8, reversed such that the arm portions 24 extend rearwardly therefrom instead of forwardly thereof, and the slide members 12,14 replaced on the other arm members 8,6 as seen in FIGS. 4 and 8. The pin members 26 are still located adjacent the inner edges of the arm members 6,8, but the distance between the pin members 26 and the abutment surface on the adaptor piece can be adjusted up to about 8 inches.

Thus there is provided a ceramic tile gauge which enables the accurate cutting of tapered part-tiles whilst automatically allowing for grouting gaps, which can be used with all makes of 6 inch and 8 inch tiles, which can be used right- or left-handed, and which is of relatively simple construction and operation involving only relative sliding movement between the movable components and therefore completely eliminating any undesirable pivoting movement between said components.

Clearly the precise construction of the gauge can vary from that described and illustrated without departing from the scope of the basic invention. For example, the engagement means may comprise other than cylindrical pin members 26, such as flat lugs typically one eighth of an inch thick, while the slide members 14,16 may be locked to the arm members 6,8 other than by cam portions 22. The gauge can be used for other than ceramic wall tiles, for example ceramic floor tiles where a larger grouting gap is usually provided between the tiles. In such a case, the engagement means, be they pin members, flat lugs or the like, will be of appropriately increased dimensions. Other modifications and variations will be apparent to those skilled in the art.

What I claim and desire to secure by Letters Patent is:

1. A ceramic tile gauge for determining the shape of a space between a fixed tile having a bounding edge and an adjacent fixed member, the gauge comprising a body member, an abutment surface on said body member extending transversely of the gauge, a pair of transversely-spaced arm members extending rearwardly of the body member, and a pair of engagement means one on each arm member, the engagement means having abutment regions thereon and each being slidably mounted on the associated arm member to be selectively and releasably lockable on said arm member, the arrangement being such that, with the abutment surface of the body member engaging with the fixed member, the engagement means are moved along the arm members into operative positions in which the abutment regions thereof engage the bounding edge of the fixed tile and are locked in said positions, the abutment surface of the body member and a straight line through the abutment regions of the engagement means then defining opposed edges of said space, said engagement means each comprising a slide member movable along the length of the associated arm member, a pin member projecting downwardly from the slide member, a rear abutment region on the pin member which, in the operative position of the slide member, engaged the bounding edge of the fixed tile, and a front abutment region on the pin member which, when the gauge is fitted to a tile to be cut, abuts the edge of said tile, the spacing between the front and rear abutment regions of the pin member being equal to twice the grouting space between adjacent tiles, further including a cam portion on each slide member selectively movable into and out of locking engagement with the associated arm member.

2. A gauge as claimed in claim 1 in which the arm members are of generally trapezoidal shape in transverse section, each slide member defining a correspondingly-shaped recess therethrough.

3. A gauge as claimed in claim 3 in which the slide members are removably and interchangeably mounted on the associated arm members.

4. A gauge as claimed in claim 1 and including an upwardly and rearwardly extending plate portion on the body member and adapted to provide a finger grip to the gauge.

5. A gauge as claimed in claim 1 in which the body member and arm members are integrally moulded from a plastics material.

* * * * *